US006556369B1

(12) United States Patent
Kanamaru et al.

(10) Patent No.: US 6,556,369 B1
(45) Date of Patent: Apr. 29, 2003

(54) DISK DRIVE DEVICE WITH A HIGH FREQUENCY ACCESS METHOD AND APPARATUS

(75) Inventors: Atsushi Kanamaru, Sagamihara (JP); Hideo Asano, Machida (JP); Tetsuo Ueda, Sagamihara (JP)

(73) Assignee: Hitachi Global Storage Technologies, Amsterdam (NL)

( * ) Notice: Subject to any disclaimer, the term of this patent is extended or adjusted under 35 U.S.C. 154(b) by 0 days.

(21) Appl. No.: 09/448,227

(22) Filed: Nov. 24, 1999

(30) Foreign Application Priority Data

Nov. 26, 1998 (JP) .......................................... 10-335681

(51) Int. Cl.⁷ ................................................ G11B 5/09
(52) U.S. Cl. .......................................... 360/75; 360/48
(58) Field of Search ........................ 360/75, 48, 77.08, 360/78.04, 78.14

(56) References Cited

U.S. PATENT DOCUMENTS

| | | | | |
|---|---|---|---|---|
| 4,839,753 A | * | 6/1989 | Ide et al. ...................... | 360/48 |
| 5,073,887 A | | 12/1991 | Takagi et al. ................ | 369/100 |
| 5,317,468 A | * | 5/1994 | Wakabayashi et al. ....... | 360/135 |

FOREIGN PATENT DOCUMENTS

| | | |
|---|---|---|
| JP | 63-083959 A | 4/1988 |
| JP | 06-290558 A | 10/1994 |
| JP | 08-017142 A | 1/1996 |
| JP | 08-087749 A | 4/1996 |
| JP | 2000021091 A | 1/2000 |
| WO | WO 96/37890 | 11/1996 |

* cited by examiner

*Primary Examiner*—David Hudspeth
*Assistant Examiner*—James L. Habermehl
(74) *Attorney, Agent, or Firm*—Randall J. Bluestone; Lewis L. Nunnelley

(57) ABSTRACT

A disk drive device comprising a disk-shaped recording medium, having a recording surface on which a plurality of tracks having a predetermined width in a radial direction are defined, said recording surface including a first area wherein a plurality of recording tracks and a plurality of non-recording tracks are located so as to form an alternating pattern along the radial direction of the recording surface. The disk drive device may further comprise: a transducer to record information on the disk-shaped recording medium; a position error detector element to detect position error relative to a target track to be recorded on; an actuator to move the transducer to the target track according to the position error; and an end-of-seek detector, wherein when the transducer is moved to a target track inside the predetermined area the end-of-seek detector determines an end of seek based on whether the position error is less than a first threshold, and when the transducer is moved to a target track outside the predetermined area, the end-of-seek detector determines an end of seek based on whether the position error is less than a second threshold, wherein the second threshold is less than the first threshold.

8 Claims, 8 Drawing Sheets

: UNUSED TRACK

: DEFECTIVE TRACK

| CYLINDER ID | 0001 | 0003 | 0004 | 0006 | ... | 0802 | | ------ |

RECORDING SURFACE

RECORDING SURFACE

DISK DRIVE DEVICE WITH A HIGH FREQUENCY ACCESS METHOD AND APPARATUS

BACKGROUND OF THE INVENTION

1. Field of the Invention

The present invention relates to disk drive devices, and more particularly to a method and apparatus for using non-recording tracks to increase disk drive performance in a frequent access area.

2. Prior Art

As the recording density increases in disk drive devices employing magnetic disks as recording media, the track pitch becomes narrower, and higher-precision seek control is needed. In addition, so-called off-track recording inhibition processing, which inhibits recording when the position of the head is a predetermined distance from the track center, is carried out to maintain reliability.

The OS (operating system) executed in information processing apparatus using this type of disk drive device also employs a predetermined area as a file system management area such as a FAT (file allocation table). The OS records information such as file attributes in this type of management area, and accesses it frequently, whenever a file is accessed.

There are cases, however, in which the seek performance of a disk drive device is degraded when higher-precision seek control or off-track write inhibition processing is implemented as described above. The impact of the degradation of the performance of frequently accessed areas such as the above-mentioned file system management area on the performance of the entire drive is particularly great.

The present invention addresses the problem described above, with the object of providing a disk drive device, a fabrication method thereof, a seek control method for a disk drive device, and a disk drive control device that can improve the access performance of frequently accessed areas such as the file system management area, the OS storage area, and storage areas of moving-picture files, contributing to an improvement in performance of the entire disk drive device, while maintaining reliability.

SUMMARY OF THE INVENTION

The present invention provides a disk drive device comprising a disk-shaped recording medium, having a recording surface on which a plurality of tracks having a predetermined width in a radial direction are defined, said recording surface including a first area wherein a plurality of recording tracks and a plurality of non-recording tracks are located so as to form an alternating pattern along the radial direction of the recording surface.

An embodiment of the present invention further comprises a transducer to record information on the disk-shaped recording medium; a position error detector element to detect position error relative to a target track to be recorded on; an actuator to move the transducer to the target track according to the position error; an end-of-seek detector; wherein when the transducer is moved to a target track inside the predetermined area the end-of-seek detector determines an end of seek based on whether the position error is less than a first threshold, and when the transducer is moved to a target track outside the predetermined area, the end-of-seek detector determines an end of seek based on whether the position error is less than a second threshold, wherein the second threshold is less than the first threshold; and a write inhibitor, wherein when the target track is inside the predetermined area the write inhibitor inhibits a write operation when the position error is greater than a first threshold, and when the target track is outside the predetermined area the write inhibitor inhibits a write operation when the position error is greater than a second threshold, wherein the second threshold is less than the first threshold.

DESCRIPTION OF THE PREFERRED EMBODIMENTS

Figure 1:
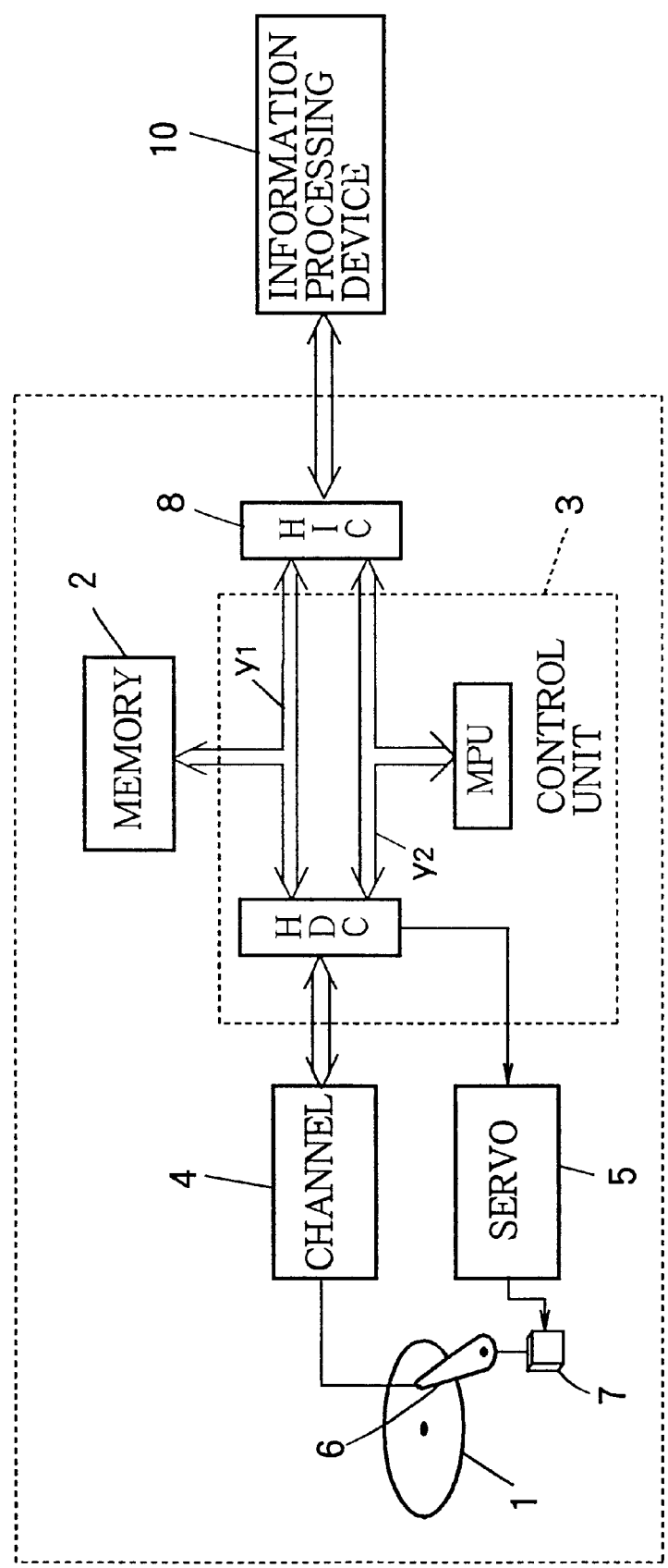
FIG. 1 is a block diagram showing the configuration of a disk drive device embodying the present invention.

FIG. 1 is a block diagram of a disk drive device according to an embodiment of the present invention. The disk drive comprises a magnetic disk 1 for recording data, a memory 2 to store control programs, read/write data, etc., a control unit 3 that controls, among other things, the operation of the entire disk drive and the input and output of data to and from a host device 10 such as an external personal computer or the like, a channel 4 that carries out mutual conversion between analog signals and digital data, a servo system 5 that controls the read/write position of a head 6 according to control from control unit 3, a head 6 for reading data from and writing data to magnetic disk 1, a head driving mechanism (rotary actuator) 7 that moves head 6 in an approximately radial direction of magnetic disk 1, and an interface (HIC: Host Interface Controller) 8 for controlling input and output to and from external information processing device 10.

Memory 2 includes an area in which read/write data, control programs for control unit 3, data (for example, a reassignment table etc.) and the like are stored, and a buffer area in which read/write data is stored. The buffer area has a capacity capable of storing data for several hundred or more recording units (data sectors) of the magnetic disk 1. Control unit 3 comprises such items as a processor (MPU) that executes control programs, a hard disk controller (HDC) that performs calculations relating to a position error signal (PES), servo data, and the like, a data bus $y_1$ to which memory 2 and HIC 8 are coupled, and a control bus $y_2$ to which the MPU, HDC, and HIC 8 are coupled. By executing the control programs stored in memory 2, control unit 3 controls the operation of the entire disk drive device, including, magnetic disk 1 read and write operations, according to commands and data supplied from host device 10. Control unit 3, which is adapted to execute a plurality of processes concurrently, controls the read/write data in the cache, the position of head 6, etc.

Head 6 comprises, for example, an inductive recording head and a read head employing, an MR (magnetoresistive) element or a GMR (giant magnetoresistive) element. HIC 8, which is coupled to memory 2 by one of the data buses in control unit 3, executes input-output control of commands with the host device 10 and input-output control of data via memory 2.

A large number of recording tracks are formed on the recording surface of magnetic disk 1 at regular intervals in the radial direction. Servo sectors are recorded at regular angular intervals (for example, 360°/66) for identification of each of these tracks, detection of tracking error, or the like. Such items as a burst pattern for detecting tracking error, a cylinder ID for identifying each individual track, and a physical sector number for identifying each individual servo sector are recorded in these servo sectors.

Figures 2, 3:
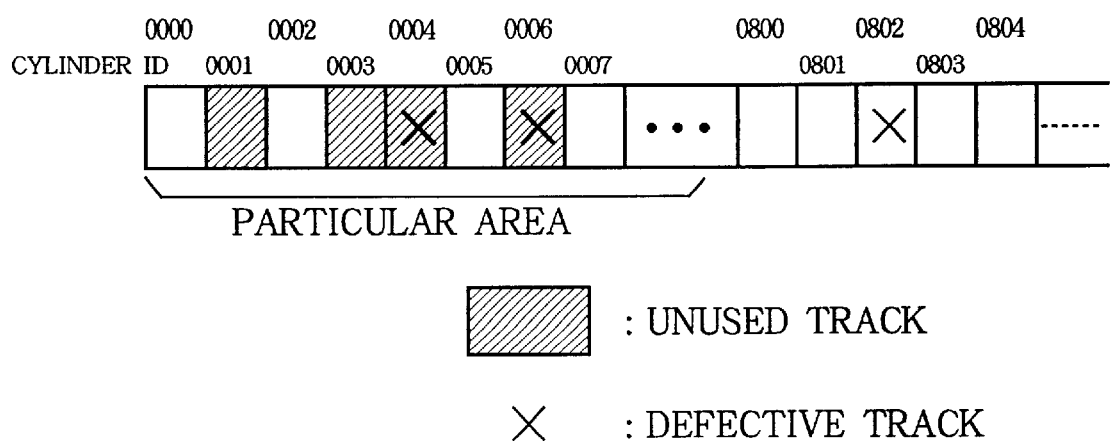
FIG. 2 is a diagram showing recording areas on a magnetic disk.
FIG. 3 is a diagram showing a bad track table for listing defective tracks.

As shown in FIG. 2, in a frequently accessed area in the disk drive of FIG. 1, at least one unused track (non-recording track) is provided between tracks used for recording. One example of such a frequently accessed area is an area used as a file system management area with, a FAT (File Allocation Table) in which file attributes, the positions at which the files are recorded, and the like are recorded by the OS. This management area is provided in an area comprising, for example, the outermost several tracks or several tens of tracks on the magnetic disk 1; information is recorded indicating the areas in which the OS has recorded files on the magnetic disk, and indicating attributes of the files, such as the date, type of file, and access restrictions. This information is accessed frequently, whenever a file is written on or read. Because of the provision of at least one unused track (a track not used for recording, including defective tracks) between tracks used for recording in this type of frequently accessed area (referred to hereinafter simply as a 'frequent access area'), even if the recording position is slightly incorrect, within the width of one track (or half of that width), this does not affect the data on the adjacent track used for recording.

As is explained in detail below, during recording, the head is moved to the target track by a seek operation; when the position error from the target track is equal to or less than a predetermined threshold, track following control makes head 6 follow the target track, and data is recorded. The position error of the head is also monitored during the recording of data, and if the head moves away from the target track by a predetermined threshold value or more, or if it shows a tendency to move away, recording is inhibited, to prevent so-called off-track recording.

As stated above, at least one unused track is provided between tracks used for recording in the frequent access area, so seek characteristics can be improved by relaxing the threshold for detecting end-of-seek, or the threshold for preventing off-track recording. To relax these thresholds, making the track pitch wider in the frequent access area than in other areas could also be considered, but if the track pitch on the recording surface of the magnetic disk 1 becomes non-uniform, servo patterns of corresponding width must be formed, and the recording of servo patterns becomes difficult. Also, a non-uniform track pitch can actually worsen seek characteristics and performance. Management of unused tracks could be carried out separately from conventional management of bad tracks, with operation being switched when access to a track in the frequent access area occurred, but among other things, the control system would become complex, and there would be room for improvement from the viewpoint of enhancing the performance of the disk drive device.

It is known to record defective tracks in disk drives detected at the time of manufacture in a bad track table of the type shown in FIG. 3, for example. Tracks with defects should not be used for recording data. An individual address (cylinder ID) is assigned to each track on the recording surface, and the defective tracks are managed by listing their cylinder IDs in a table like the one shown in FIG. 3. Using this table, control unit 3 detects tracks without defects, assigns logical cylinder numbers to these tracks, and manages them as areas used for recording.

In the disk drive of FIG. 1, the unused tracks, instead of the conventional defective tracks, are listed in the bad track table shown in FIG. 3. Thus, control unit 3 does not use the listed unused tracks for the recording of data. This table is recorded in a predetermined area on the magnetic disk 1, for example, when the disk drive device is manufactured; during use, it is read from the predetermined area when the power of the disk drive is switched on, for example, and is stored in memory 2, or in registers or the like provided by control unit 3.

In the disk drive of FIG. 1, control unit 3 also stores information (for example, a range of logical cylinder numbers) indicating which area has been designated as the frequent access area, and carries out changes of the above-mentioned thresholds responsive thereto. This information may, like the bad track table, be recorded in a predetermined area on the magnetic disk 1 and read at time of operation, or it may be installed as firmware in the microcode or the like of the MPU in control unit 3. In addition, all but the servo sectors of an unused track may be erased, placing it in the state in which nothing has been recorded. Head 6 can thereby be made not to reproduce unnecessary signals during read operations. With erasure performed in this way, even if tracking is somewhat inexact during read operations, the reproduced signal is only weakened, so it is possible to read the data by amplifying the reproduced signal to a suitable level or using other signal processing techniques.

In operation, when data is read or written in a disk drive according to the present invention, the area on which read and write operations are carried out is specified in predetermined data-block units by the information processing device 10. From the indicated data block identification information (for example, an LBA: Logical Block Address), control unit 3 determines information (for example, track, sector, or the like) indicating the actual recording position on the magnetic disk 1.

Figure 4:
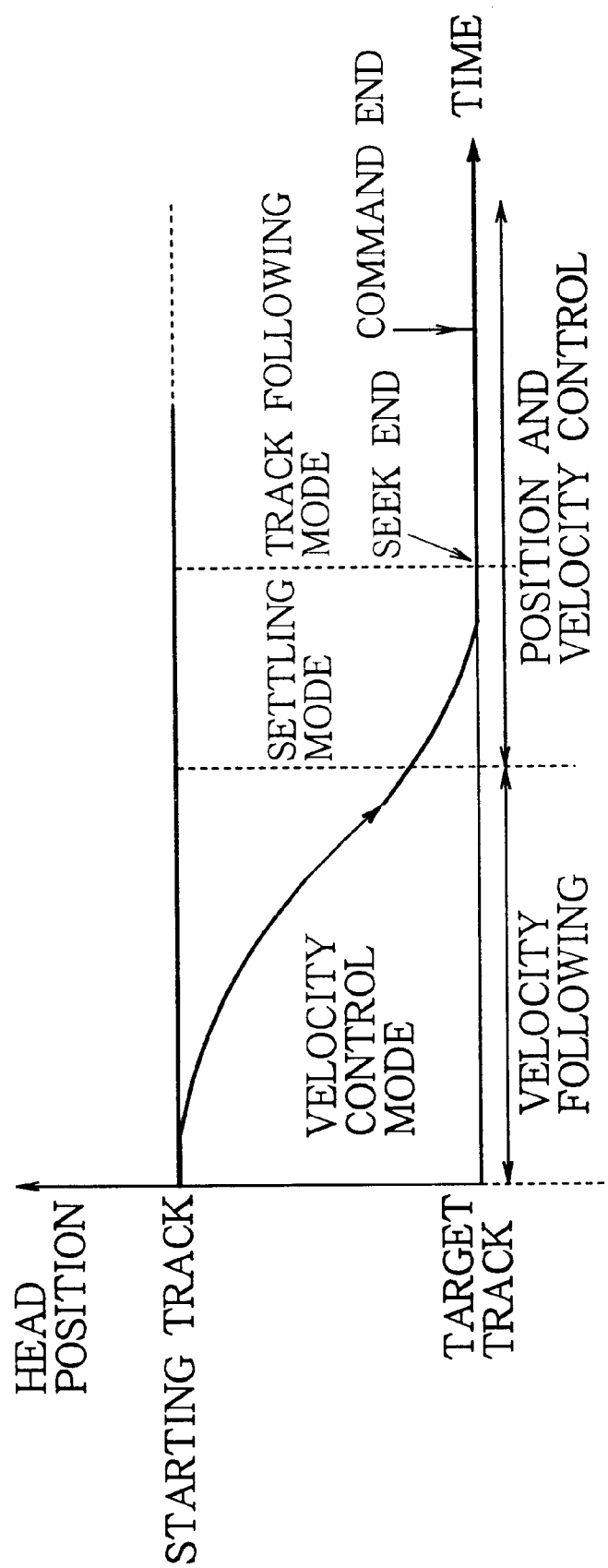
FIG. 4 is a diagram showing position error and the switching of operating modes in a seek operation.

When the target track has been calculated, control unit 3 moves head 6 to the target track as shown in FIG. 4. In this seek operation, first head 6 is accelerated toward the target track; when the velocity of head 6 reaches a predetermined velocity, head 6 is moved at a constant velocity (velocity control mode). Next, when head 6 reaches the vicinity of the target track, head 6 is decelerated (settling mode). When head 6 reaches the target track, the seek operation ends, and head 6 follows the target track (track following mode). To provide this seek control and track following control, control unit 3 determines the position error signal (PES) from the position of head 6 to the target track, and supplies corresponding servo data to head driving mechanism 7.

Figure 5:
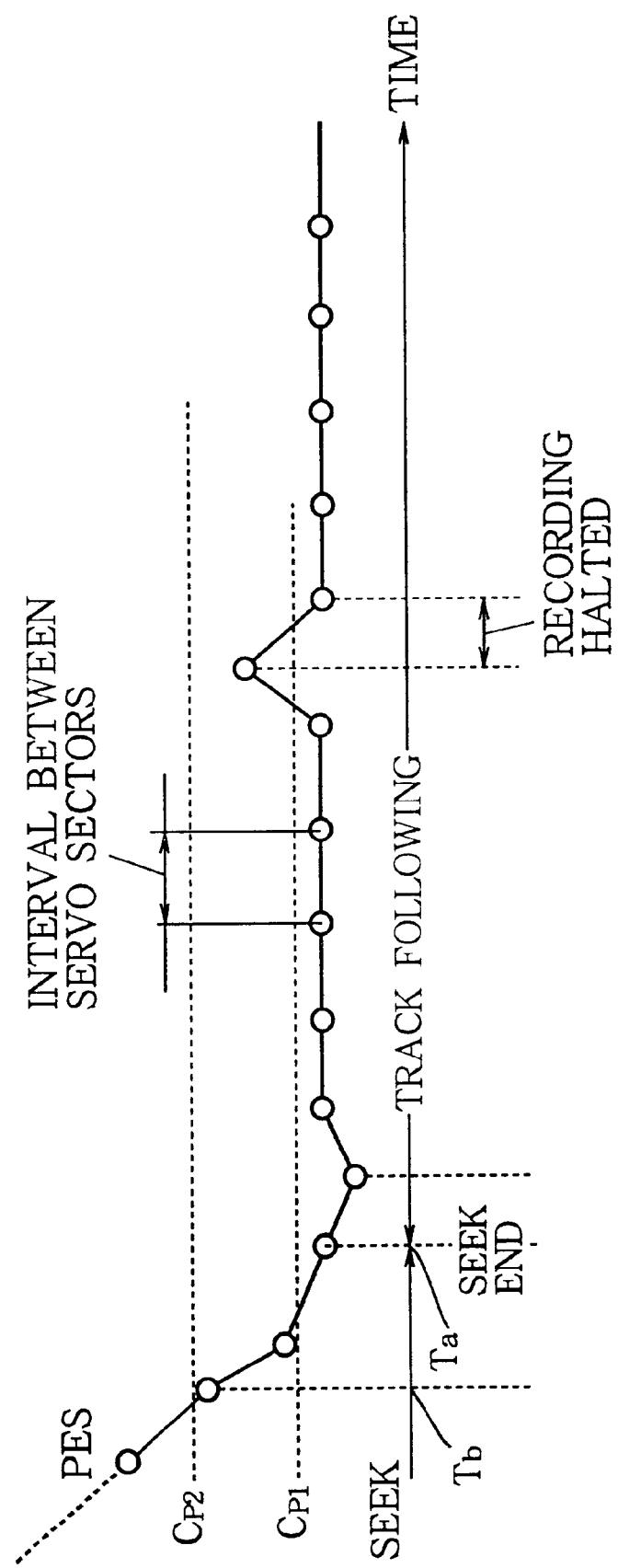
FIG. 5 is a diagram showing the switching of operating modes.

Each time the burst pattern of one of the above-mentioned servo sectors is reproduced, channel 4 determines the reproduced levels of the burst pattern, converts them from analog to digital (A/D), and detects the cylinder ID and the like from the reproduced output of the servo sector. Control unit 3 detects the current position of head 6 from the cylinder ID and the data indicating the reproduced levels of the burst pattern supplied from channel 4, determines the position error signal (PES) with respect to the target track, and controls the switching of the modes mentioned above. Control unit 3 determines whether to switch from settling mode to track following mode by detecting whether the PES is equal to or less than a predetermined threshold (Cp), as shown in FIG. 5. It also changes this threshold Cp, depending on whether the target track is in the frequent access area or not, as mentioned above. It carries out the processing that changes this threshold Cp according to the flowchart shown in FIG. 6, for example.

Figure 6:
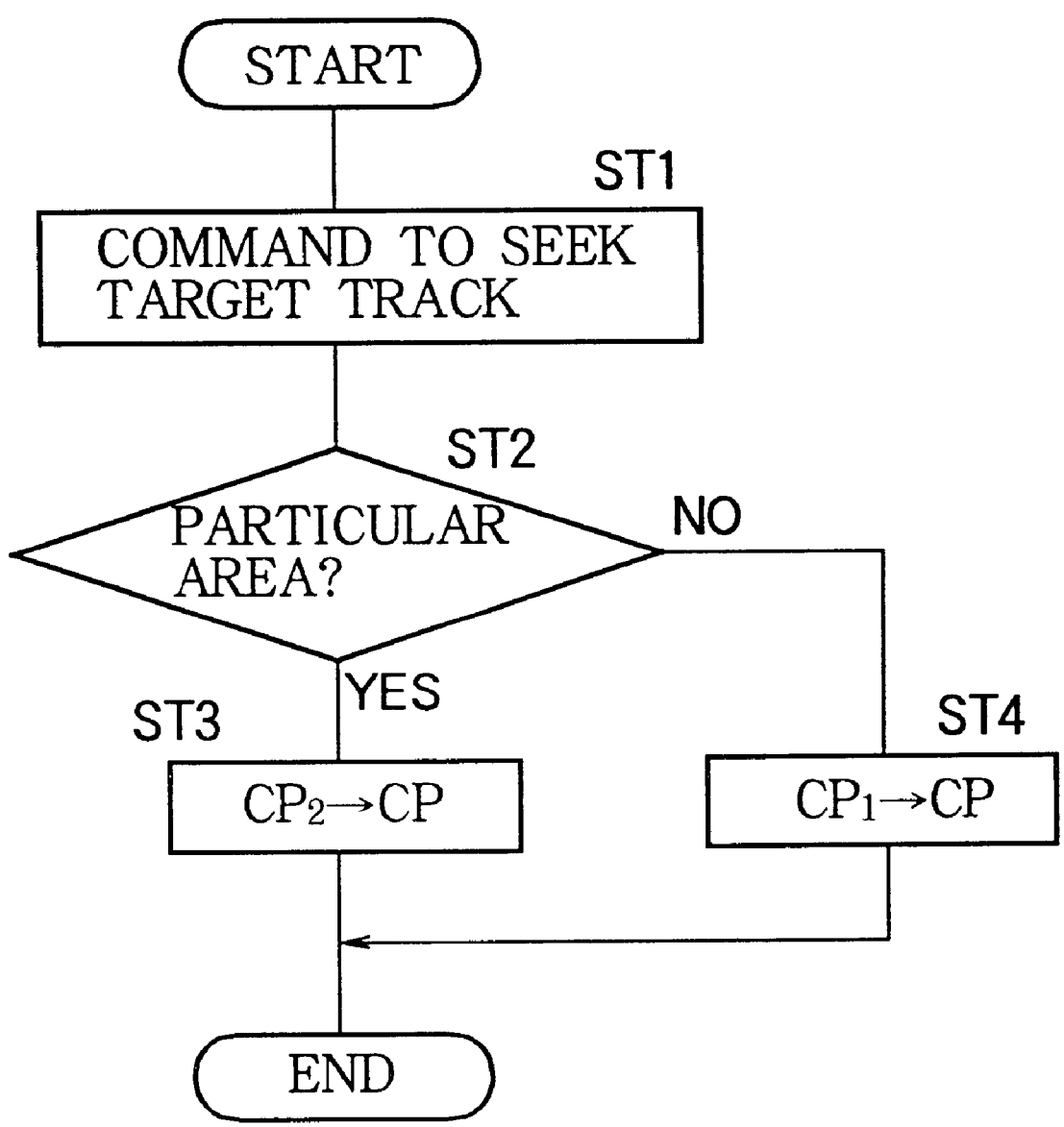
FIG. 6 is a flowchart showing the process of setting off-track criteria.

Control unit 3 begins execution of the processing shown in FIG. 6 upon determining the target track as described above. In step ST1, control unit 3 begins seeking the target track, and proceeds to step ST2. As stated above, control unit 3 is able to execute a plurality of processes concurrently; the subsequent seek control is executed independently of the processing shown in FIG. 6. In step ST2, control unit 3 detects whether or not the logical cylinder number m of the target track belongs to the frequent access area. Specifically, control unit 3 stores information indicating the frequent access area as described above, as information indicating a range of logical cylinder numbers or the like (for example, S, T, if the area has logical cylinder numbers from S to T), and detects whether or not the logical cylinder number m of the target track is within this range.

Figure 7:
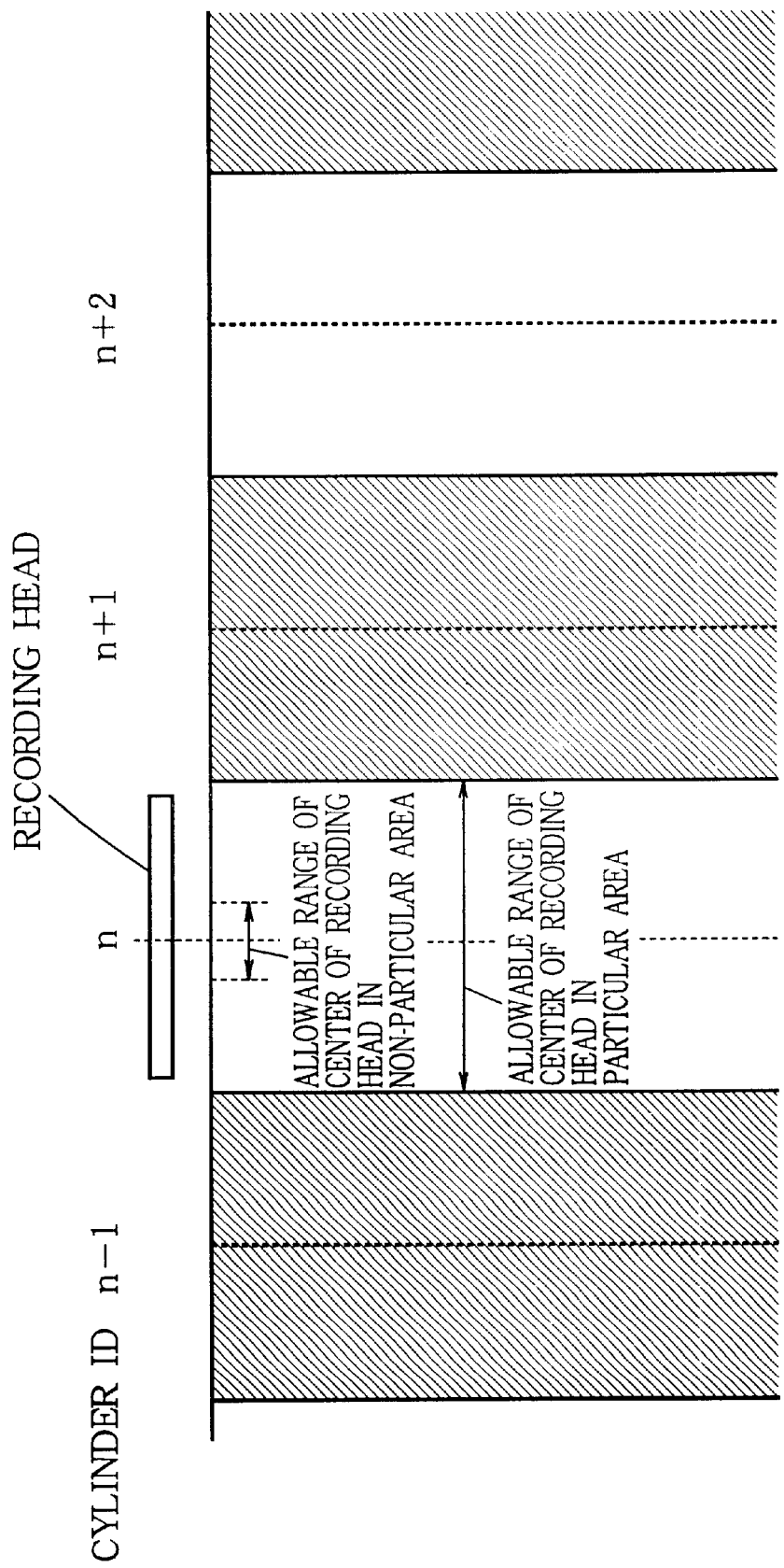
FIG. 7 is a diagram for explaining the method of setting thresholds Cp1 and Cp2.

If the target track is not within the frequent access area, the process proceeds to step ST3 and ends with the threshold Cp set to the normal value Cp1. Conversely, if the target track is within the frequent access area, the process proceeds to step ST4, and ends with the threshold Cp set to a value Cp2 more lax than the normal value Cp1. The threshold Cp for detecting end-of-seek is thereby set to an appropriate value according to the position of the target track. The following describes setting the Cp1 and Cp2 threshold values in the frequent access area and in non-frequent access areas. In areas outside the frequent access area, tracks having consecutive logical cylinder numbers are mutually adjacent, and to avoid interference and the like between adjacent tracks, the threshold Cp1 for detecting end-of-seek is a PES indicating a range of substantially 1/8 of the track width, for example, as shown in FIG. 7. In the frequent access area, however, there is at least one unused track between tracks having consecutive logical cylinder numbers, and interference and the like with the adjacent track can be prevented even if the PES is substantially 1/2 of the track width, for example. The threshold Cp2 for detecting end-of-seek is therefore a PES indicating a range of substantially 1/2 of the track width, for example. This Cp2 may also be approximately the track width, or the sum of 1/2 the track width and a certain margin. Because of the setting of a threshold Cp according to the area to which the target track belongs, the timing (Tb) at which a seek ends in the frequent access area can be earlier than the timing (Ta) at which a seek ends in a non-frequent access area, as shown in FIG. 5. Seek characteristics can thereby be improved in the frequent access area. Since the frequency of access to the frequent access area is high, as mentioned above, improving the seek characteristics of the frequent access area contributes to an improvement in the performance of the entire disk drive device.

Also, in the disk drive of FIG. 1, the control load is scarcely increased, because all that has been done is to provide at least one unused track on each side of each track used for recording in the frequent access area, and relax the threshold for detecting end-of-seek in the frequent access area, as compared with non-frequent access areas. Incidentally, during recording, besides executing the track following control described above, the device also determines whether to inhibit a write operation when the position of head 6 departs from the target track. A write inhibit is executed when the detected PES is equal to or greater than a predetermined threshold value (Cp), or when the temporal change in the PES is greater than a predetermined threshold (Cv).

In the disk drive of FIG. 1, these thresholds are switched depending on whether the target track belongs to the frequent access area or not. Specifically, in track following control, processing similar to the processing shown above in FIG. 6 is carried out, and the values of the thresholds Cp and Cv for deciding whether to inhibit write operations are set appropriately, depending on whether the target track belongs to the frequent access area or not. Because the values of the thresholds Cp and Cv for deciding whether to inhibit write operations are set in this way, even in cases in which write operations would be inhibited in a non-frequent access area, as shown in FIG. 5, write operations can be carried out in the frequent access area if the PES and the temporal change of the PES are within the allowable ranges. Write operation performance can thereby be enhanced on tracks in the frequent access area.

Incidentally, in the reading of a track in the frequent access area, read operations can be carried out even if head 6 is somewhat out of position, because unused tracks are provided on both sides of the track used for recording. An error correction code (ECC) is added to the recorded data in each predetermined sector. If the data can be reproduced by means of the ECC, it suffices to regard the reproduced data as valid; inhibition processing responsive to the PES or the temporal change of the PES does not have to be carried out as in recording.

Figure 8:
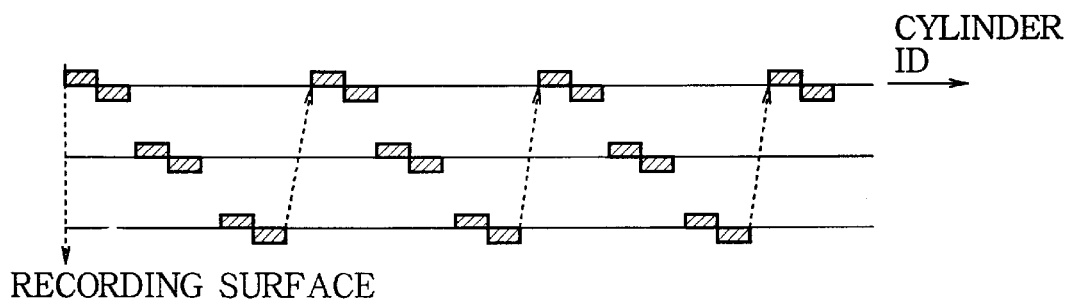
FIG. 8 is a diagram showing an example of access to the magnetic disk 1.
Figure 9:
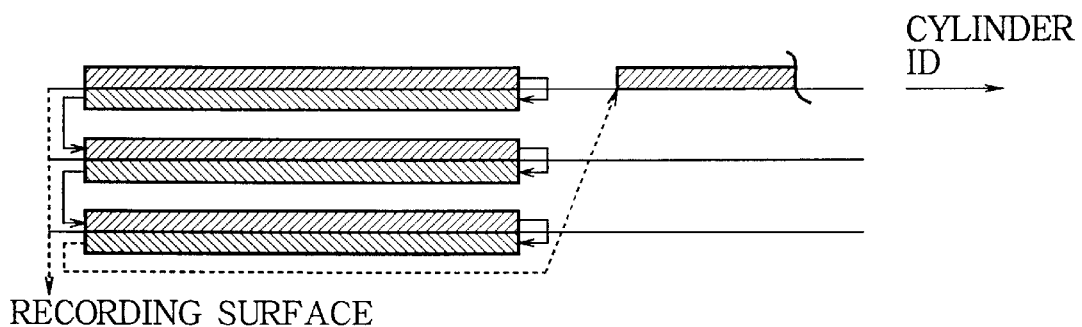
FIG. 9 is a diagram showing another example of access to the magnetic disk 1.

When there are a plurality of recording surfaces, there are cases in which access is carried out by sequentially changing the cylinder ID after access to the tracks (cylinder) having the same cylinder ID on each recording surface, as shown in FIG. 8. There are also cases in which, after access is carried out by sequentially changing the cylinder ID on the same recording surface, access is carried out on another recording surface, as shown in FIG. 9. When access is carried out as shown in FIG. 8, a bad cylinder table may be provided on a cylinder basis, instead of a bad track table on a track basis, and defective tracks and unused tracks may be managed on a cylinder basis. When access is carried out as shown in FIG. 9, a bad track table as described above may be provided for each recording surface, and management of unused tracks similar to that described above may be carried out for each recording surface. During the fabrication of the type of disk drive device described above, the processes of detecting servo sectors and defective tracks, recording the bad track table, and so on are carried out in the state in which the magnetic disk 1, head 6, etc. are mounted in the housing.

Figure 10:
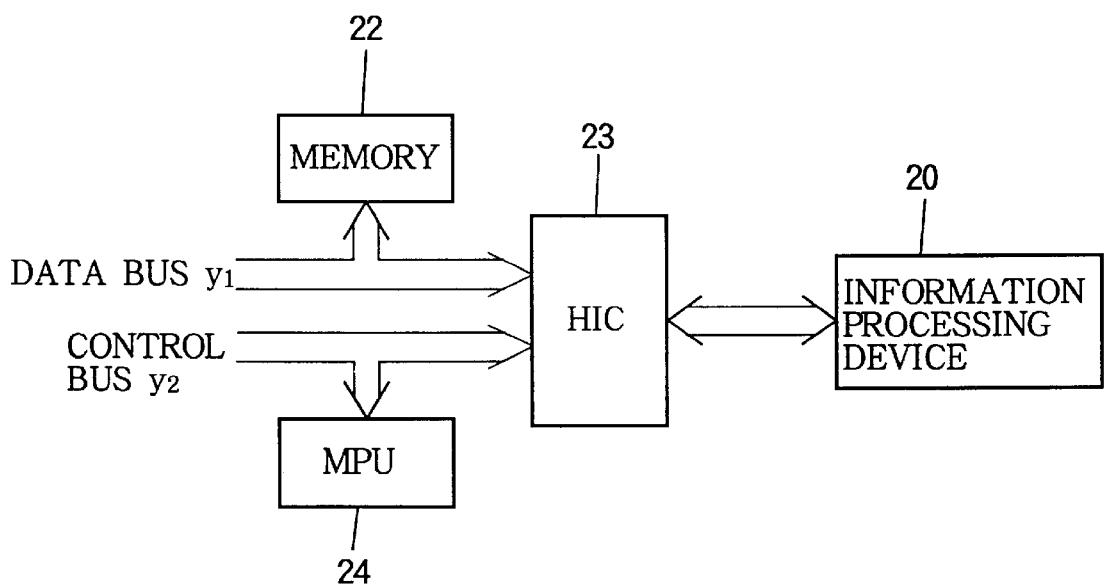
FIG. 10 is a diagram showing the configuration of a disk drive test apparatus.

FIG. 10 shows the configuration of a test apparatus for carrying out this type of test. This test apparatus is coupled to the above-described disk drive device and used after fabrication has ended; it comprises a memory 22 and HIC 23 coupled to the data bus $y_1$ in FIG. 1 above, an MPU 24 coupled to the control bus $y_2$ and HIC 23, and an information processing device 20 coupled to the HIC 23. The information processing device 20 or MPU 24 executes read and write operations on the magnetic disk 1 through the HIC 23, designates tracks on which recording was not carried out normally as defective tracks, and lists them in the bad track table shown in FIG. 3 above. The information processing device 20 also provides unused tracks on both sides of the tracks used for recording in the frequent access area, and similarly lists them in the bad track table.

Figure 11:
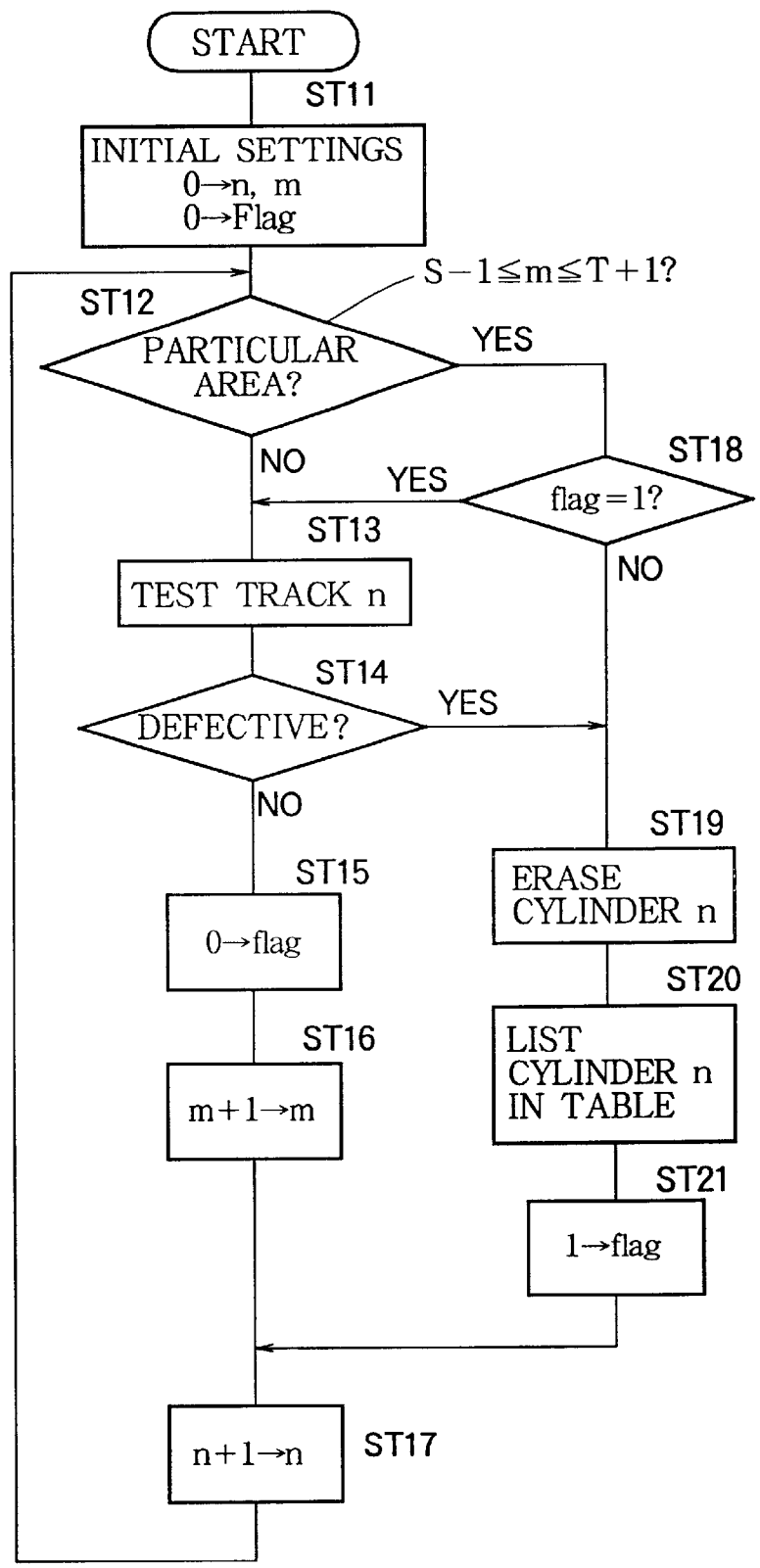
FIG. 11 is a flowchart showing the process of listing defective tracks and unused tracks.

These listing processes are carried out according to the flowchart shown in FIG. 11. In the following exemplary description, the frequent access area is specified in advance as the area with logical cylinder numbers from S to T. First, variables are initially set in step ST11, and the process proceeds to step ST12. Specifically, a variable n for counting physical track numbers (cylinder IDs) and a variable m for counting logical track numbers are initialized to zero, and the value of a flag indicating whether the track corresponding to the immediately preceding physical track number has been listed in the bad track table is initialized to zero, indicating that it has not been listed. Step ST12 detects whether or not the current logical track number m is inside the frequent access area or adjacent the frequent access area, that is, whether or not the current track number m is equal to or greater than S−1 and equal to or less than T+1. If this condition is not satisfied, the process proceeds to step ST13, because the track corresponding to the current logical track number is not in the frequent access area or adjacent the frequent access area; if the condition is satisfied, the process proceeds to step ST18, because the track corresponding to the current logical track number is in the frequent access area or adjacent the frequent access area.

Step ST13 executes a test by reading and writing etc. on the track corresponding to physical track number n, to detect whether this track is a defective track or not; then the process proceeds to step ST14. Step ST14 decides whether or not it is necessary to list the track in the bad track table, proceeding to step ST19 if the track corresponding to the current physical track number n is defective and needs to be listed, and to step ST15 if the track is normal and does not need to be listed. Step ST15 sets the value of the flag to zero, indicating that the track corresponding to physical track number n is not listed in the bad track table, and proceeds to step ST16. Step ST16 increments the value of the variable m by one and proceeds to step ST17; step ST17 increments the value of the variable n by one and returns to step ST12. Processing similar to that described above is thereby repeated for the track corresponding to the next physical track number.

Step ST18 decides whether or not the value of the flag is one, indicating that the track corresponding to the immediately preceding physical track number is listed in the bad track table; proceeds to step ST13 if it is; and proceeds to step ST19 if it is not. Step ST19 erases all but the servo sectors of the track corresponding to physical track number n, and proceeds to step ST20. Specifically, it supplies direct current to the recording head 6, and places all of the track except for the servo sectors in a particular magnetic state. Step ST20 lists physical track number n in the bad track table shown in FIG. 3 above; the next step ST21 sets the value of the flag to one, which is the value indicating that the track corresponding to physical track number n has been listed in the bad track table, and proceeds to step ST17. Thus it causes the value of the variable n to be incremented by one in step ST17 and returns to step ST12, and processing similar to the above is repeated for the track corresponding to the next physical track number. By repetition of the processing described above until a predetermined logical cylinder number is reached, regarding tracks in the frequent access area, the processing of step ST19 and subsequent steps is executed, listing them in the bad track table, only when they are defective tracks. Regarding tracks in the frequent access area, however, the processing of step ST19 and the subsequent steps is also executed, listing them in the bad track table, when the flag is zero; that is, when the track corresponding to the immediately preceding physical track number is not listed in the bad track table. Thus, at least one unused track comes to exist between the tracks used for recording in the frequent access area; that is, between tracks not listed in the bad track table.

When the predetermined logical cylinder number is reached, the processing shown in FIG. 11 ends, the bad track table that has been formed is recorded in a predetermined area on the magnetic disk 1, and the test ends. The bad track table recorded in this way is read into memory 2 and used as described above when the disk drive device is used. However, when access is carried out as shown in FIG. 8 above, a table that manages unused tracks on a cylinder basis is employed instead of the bad track table shown in FIG. 3, and the above-described test in step ST13 is carried out on a cylinder basis. Moreover, when access is carried out as shown in FIG. 9, a number of bad track tables are provided, matching the number of recording surfaces, and the processing shown in FIG. 11 is executed a number of times equal to the number of recording surfaces.

The present invention is not limited to the embodiments described above; for example, the applicability of the present invention is not limited to the disk drive device described above; it can be applied to other disk-shaped recording media such as magneto-optical disks and the like, provided they have a predetermined area that is accessed frequently, and other suitable changes can be made within the scope of the technical concepts of the present invention.

A file management area was described as an example in the above-described embodiment, but there are other areas that are frequently accessed, such as the area storing the OS itself, areas storing library files that are used frequently by the OS, applications, and so forth. Or in a disk drive device in which performance has priority, such as storage devices for moving pictures, all of the areas may have a similar configuration.

By arranging tracks used for recording and tracks not used for recording alternately in a predetermined area on the recording surface of a disk drive device, the present invention can relax the conditions of the end-of-seek criteria etc. It can, accordingly, contribute to an enhancement of the performance of the disk drive device while maintaining reliability.

What is claimed is:

1. A disk drive device, comprising:
   a disk-shaped recording medium;
   a motor to rotate said disk-shaped recording medium;
   a controller coupled to said motor; and
   said disk-shaped recording medium having a recording surface on which a plurality of tracks having a predetermined width in a radial direction are defined, said recording surface including a first area wherein a plurality of recording tracks and a plurality of non-recording tracks are located so as to form an alternating pattern along the radial direction of the recording surface.

2. The disk drive device of claim 1, further comprising:
   a transducer to record information on said disk-shaped recording medium;

a position error detector element to detect position error relative to a target track to be recorded on;

an actuator to move said transducer to the target track according to said position error; and an end-of-seek detector, wherein when said transducer is moved to a target track inside said predetermined area said end-of-seek detector determines an end of seek based on whether said position error is less than a first threshold, and when said transducer is moved to a target track outside said predetermined area, said end-of-seek detector determines an end of seek based on whether said position error is less than a second threshold, wherein said second threshold is less than said first threshold.

3. The disk drive device of claim 1, further comprising:

a transducer to record information on said disk-shaped recording medium;

a position error detector element to detect position error from a target track to be recorded on; and a write inhibitor, wherein when said target track is inside said predetermined area said write inhibitor inhibits a write operation when said position error is greater than a first threshold, and when said target track is outside said predetermined area said write inhibitor inhibits a write operation when said position error is greater than a second threshold, wherein said second threshold is less than said first threshold.

4. The disk drive device of claim 1, wherein:

servo sectors are recorded in said tracks; and data areas of said non-recording tracks are initially set to a predetermined magnetic state.

5. A method of formatting a disk drive device, comprising the steps of:

forming tracks having a predetermined width in a radial direction on a recording surface of a disk-shaped recording medium; and defining tracks used for recording and non-recording tracks in an alternating pattern in the radial direction in a predetermined area of said recording surface.

6. The method of formatting a disk drive device of claim 5, further comprising the step of recording a table indicating said non-recording tracks in a predetermined area of said recording surface.

7. The method of formatting a disk drive device of claim 5, further comprising the steps of:

recording servo sectors on said tracks when said tracks are formed; and setting to a predetermined magnetic state data areas of said non-recording tracks.

8. The method of formatting a disk drive device of claim 5, further comprising the steps of:

detecting whether said tracks that are formed are defective or not; and making a non-defective track one of said non-recording tracks when the non-defective track is adjacent to a track used for recording in said predetermined area, and making a defective track one of said non-recording tracks when the defective track is adjacent to one of said tracks used for recording in said predetermined area.

* * * * *